3,227,728
PREPARATION OF DIIMIDAZOL-1-YL DERIVA-
TIVES OF PHOSPHINE OXIDE
Leo P. Parts, Dayton, Ohio, assignor to Monsanto Research Corporation, St. Louis, Mo., a corporation of Delaware
No Drawing. Filed Nov. 26, 1963, Ser. No. 326,226
7 Claims. (Cl. 260—309)

This invention relates to organic compounds of phosphorus and nitrogen and more particularly provides a new and valuable method of preparing certain heterocyclic nitrogen-substituted phosphine oxides.

According to the invention, there are prepared certain aromatic hydrocarbyl diimidazol-1-ylphosphine oxides by the reaction of an imidazolyl metal with an aromatic hydrocarbyl-phosphonic dichloride, substantially according to the scheme:

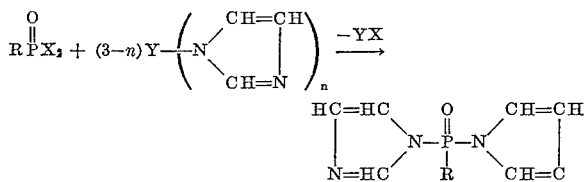

wherein R is aromatic hydrocarbyl which is free of olefinic and acetylenic unsaturation and contains from 6 to 12 carbon atoms, X is halogen having an atomic weight of at least 35, and Y is selected from the class consisting of alkali and alkaline earth metals and $n$ is an integer of 1 to 2.

Presently useful hydrocarbyl phosphonic dihalides are phenyl- or alkylphenylphosphonic dichlorides, dibromides or diiodides such as phenylphosphonic dichloride or dibromide, o-, m- or p-tolylphosphonic dichloride, dibromide or diiodide, o-, m- or p-ethylphenylphosphonic dichloride or diiodide, o-, m- or p-butylphenylphosphonic dichloride or dibromide, o-, m- or p-hexylphenylphosphonic dibromide or diiodide, 2,3-, 3,4- or 4,5-dipropylphenylphosphonic dibromide or dichloride and pentamethylphenylphosphonic dichloride or dibromide; cycloalkylphenylphosphonic dibromides or dichlorides such as o-, m- or p-cyclohexyl or (2-methylcyclopentyl)phenylphosphonic dichloride or dibromide; o-, m- or p-biphenylylphosphonic dichloride or dibromide; 3-acenaphthenyl dibromide or dichloride; α- or β-naphthylphosphonic dibromide or diiodide, etc.

The useful imidazolyl metals include imidazol-1-ylsodium, imidazol-1-ylpotassium, imidazol-1-yllithium, imidazol-1-ylrubidium, diimidazol-1-ylbarium, diimidazol-1-ylcalcium, diimidazol-1-ylmagnesium, diimidazol-1-ylstrontium, etc. The imidazol-1-yl metals are readily prepared by reaction of the metal with imidazole in liquid ammonia; see, e.g., H. H. Strain, J. Amer. Chem. Soc., 49 1995 (1927), or in an inert organic, polar liquid such as the alkyleneglycol ethers, dioxane, or tetrahydrofuran.

Diimidazol-1-ylarylphosphine oxides provided by the invention are e.g., diimidazol-1-ylphenyl-, diimidazol-1-yl-o-, m-, or p-tolyl-, diimidazol-1-yl-o-, m-, or p-isopropylphenyl-, diimidazol-1-yl-o-, m-, or p-pentylphenyl-, diimidazol-1-yl-2,3- or 3,4- or 4,5-dimethylphenyl, diimidazol-1-yl-o-, m-, or p-cyclohexylphenyl-, diimidazol-1-yl-o-, m- or p-biphenylyl-, or diimidazol-1-yl-α-methyl-β-naphthylphosphine oxide.

Reaction of the aromatic hydrocarbylphosphonic dihalide with the imidazolyl metal to give the presently provided diimidazol-1-ylhydrocarbylphosphine oxides is conducted by simply mixing the two reactants and allowing the mixture to stand at ordinary or increased temperatures until formation of said phosphine oxide compound is completed. Advantageously, in order to obtain smooth reaction and optimum yield of the product, the reaction is conducted in the presence of an inert organic liquid diluent or solvent, which may be, e.g., an ether such as butyl ether 1,2-dimethoxyethane, diglyme, morpholine or tetrahydrofuran, an aliphatic, alicyclic or aromatic hydrocarbon such as xylene or kerosene, etc.

The reaction is generally exothermic; hence, heating is usually not required and may be conducted by operating at ambient temperatures, or even with cooling. However, when working with the somewhat sluggish higher hydrocarbylphosphonic dihalides, e.g., the biphenylphosphonic dichlorides or the cyclohexylphosphonic dibromides, heating may be used for the purpose of decreasing reaction time. In experimental runs, after the initial reaction has subsided, heating may be used to assure completion of the reaction. Temperatures of from, say, 60° C. to 150° C. are thus useful. When working in the presence of a diluent or solvent, refluxing temperatures of the reaction mixture are conveniently employed to assure completion of the reaction.

The reaction occurs with liberation of metal halide, and the diimidazol-1-ylhydrocarbylphosphine oxide is conveniently separated from the reaction product by filtering or centrifuging, the metal halide generally being insoluble in the organic components of the reaction mixture. The phosphine oxide product is then isolated by distillation, solvent extraction, etc. The desired products are generally not so volatile as are the commonly employed diluents; hence, the diluent or solvent, if one is employed, is usually distilled off, with the phosphine oxide as residue. If desired, this may be purified, e.g., for the removal of imidazole, by recrystallization, sublimation or distillation.

One mole of the aromatic hydrocarbylphosphonic dihalide reacts with one mole of a diimidazol-1-yl-metal or with two moles of a mono-imidazol-1-yl metal to give the present diimidazol-1-ylhydrocarbylphosphine oxides; hence, the two reactants may be employed in such stoichiometric proportions. However, an excess of either reactant may be used, since any unreacted material can be readily separated from the desired diimidazol-1-ylhydrocarbylphosphine oxide.

The presently prepared diimidazol-1-ylhydrocarbylphosphine oxides are stable, well-defined compounds which are generally high-melting, crystalline solids. They are particularly valuable as starting materials for the preparation of linear, polymeric phosphonamides by reaction with hydrocarbon diamines. Thus, as disclosed in the Greenley and Nielsen application, Serial No. 294,182, filed July 10, 1963, and now abandoned, they react as follows with an alkylenediamine:

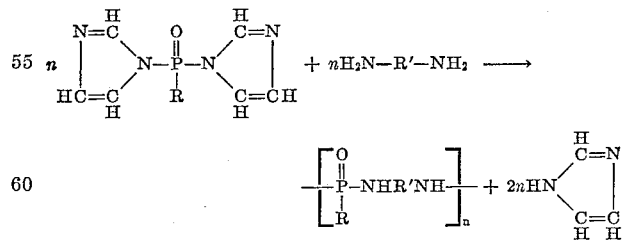

wherein R is the herein defined aromatic hydrocarbyl radical and R' is an alkylene radical having from 3 to 15 carbon atoms and having the two nitrogen atoms attached to diverse, non-adjacent carbon atoms, and $n$ denotes the degree of polymerization.

The polyphosphonamides thus obtained are solid resinous materials which are readily compression molded to give objects which are tough, transparent, highly heat-resistant and of good dimensional stability, or which may be cast into films from solutions or extruded into fibers.

According to said application, the diimidazol-1-yl-hydrocarbylphosphine oxides are prepared by the reaction of the appropriate arylphosphonic dihalide with a sufficient excess of the imidazole to enable removal of the evolved hydrogen halide in the form of the imidazolium hydrohalide; or, instead of the excess imidazole, an extraneous hydrogen scavenger is used. The by-product hydrochlorides are difficultly separated from the phosphine oxide product and use of inorganic scavenger is impracticable because it requires introduction of water and hence involves aqueous hydrolysis of phosphonic dichloride reactant. The present procedure permits operation in the substantial absence of water and at the same time results in an easily removed by-product.

The invention is further illustrated by, but not limited to, the following examples:

*Example 1*

Sodium (46.0 g., 2.0 mole) was added over a period of 40 minutes to a mixture of 149.8 g., 2.20 mole, of imidazole and 1000 ml. of liquid ammonia and 0.1 g. ferric nitrate, $Fe(NO_3)_3.6H_2O$, as catalyst. The reaction was very rapid. The ammonia was allowed to evaporate and the solid which remained was heated with 500 ml. of toluene at 70° C. Vigorous evolution of ammonia occurred. Subsequently, more ammonia and excess imidazole were removed by heating slowly to 194° C. under vacuum. The residue, which remained solid at this temperature, was the substantially pure imidazol-1-ylsodium (177.0 g., 98.2% of theory), analyzing as follows:

| Percent | Found | Calc'd for $C_3H_3N_2Na$ |
|---|---|---|
| C | 40.26 | 40.01 |
| H | 3.50 | 3.36 |
| N | 31.10 | 31.11 |
| Na | 25.33 | 25.33 |

The imidazol-1-ylsodium was employed for preparation of diimidazol-1-ylphosphine oxide as follows: Phenylphosphonic dichloride (39.0 g., 0.20 mole) was added over a period of 42 minutes to a mixture consisting of 36.0 g., 0.40 mole, of the imidazol-1-ylsodium in 400 ml. of 1,2-dimethoxyethane. The temperature of the reaction mixture rose from 27° to 42° C. Stirring was then continued for 4 hours and the reaction mixture was sobsequently refluxed for 1.5 hours. The reaction mixture was cooled and centrifuged to remove solids and the latter were washed with 1,2-dimethoxyethane. Solvent was removed from the combined liquid phase and washings by distillation under reduced pressure. The solid which remained was recrystallized from hot toluene to give 23.8 g. (46% of theory) of the substantially pure diimidazol-1-ylphenylphosphine oxide which analyzed as follows:

| Percent | Found | Calc'd for $C_{12}H_{11}N_4OP$ |
|---|---|---|
| C | 55.58 | 55.81 |
| H | 4.26 | 4.29 |
| N | 21.71 | 21.70 |
| P | 11.99 | 12.00 |

Nuclear magnetic resonance analysis in 1,2-dimethoxyethane for $P^{31}$ gave a chemical shift at −6.0 p.p.m.

*Example 2*

Employing some of the imidazol-1-ylsodium prepared in Example 1, a solution of 78.0 g., 0.40 mole, of phenylphosphonic dichloride in 200 ml. of 1,2-dimethoxyethane was added to a suspension of 72.0 g., 0.80 mole, of the imidazol-1-ylsodium in 1,2-dimethoxyethane at such a rate that half of the solution had been introduced at the end of 0.5 hour. At this time, the temperature of the reaction mixture had risen exothermally from 25° to 46° C. The mixture was cooled to 3° C., and the remainder of the solution was added over a 1.5 hour without further cooling. When all of the solution had been added, the temperature of the reaction mixture was 30° C. The whole was warmed for six hours at 65–70° C. and for 2.5 hours at about 85° C. It was then allowed to attain room temperature and centrifuged. The solid was extracted with 1,2-dimethoxyethane, and the combined liquids were vacuum distilled to remove the solvent. The crude product was recrystallized three times from toluene to give 51.0 g. (49% yield) of the substantially pure diimidazol-1-ylphenylphosphine oxide.

*Example 3*

To pieces of potassium (46.9 g., 1.20 moles) suspended in 400 ml. of 1,2-dimethoxyethane was added a solution of imidazole (81.7 g., 1.20 moles) in 300 ml. of the same solvent. The reaction mixture was heated under nitrogen to the melting point of the potassium, and the solution of imidazole was added at a rate to maintain the metal in molten state. Stirring was continued for a brief time after addition of the imidazole was completed. To the resulting reaction mixture, which now contained imidazol-1-ylpotassium, there was added 117.0 g., 0.60 moles of phenylphosphonic dichloride over a 70 minute period. The reaction temperature rose from 29° to 51° C. Subsequently, the reaction mixture was heated to 70–80° C. for 1 hour, then cooled to room temperature and finally centrifuged. The solids were extracted with 800 ml. of 1,2-dimethoxyethane and the slurry was re-centrifuged. Evacuation of the combined liquids to remove solvent gave the crude diimidazol-1-ylphenylphosphine oxide. It was recrystallized from toluene and further purified by vacuum distillation at 150–240° C., using a large, air-cooled condenser. At the completion of the distillation, the product was melted while in the condenser and allowed to flow into a receiver. There was thus collected in the receiver 100.6 g. (64.8% of theory) of the substantially pure diimidazol-1-ylphenylphosphine oxide, analyzing as follows:

| Percent | Found | Cal'd for $C_{12}H_{11}N_4OP$ |
|---|---|---|
| C | 56.04 | 55.81 |
| H | 4.48 | 4.29 |
| N | 21.44 | 21.70 |
| P | 11.94 | 12.00 |

As is seen from the above examples, when there is used in preparing the imidazol-1-yl metal compound a diluent which can also be used in effecting reaction of said metal compound with the hydrocarbylphosphonic dihalide, no need exists for isolating the metal compound before using it to make the diimidazol-1-yl-hydrocarbylphosphine oxides. 1,2-dimethoxyethane is a good diluent for this purpose; however, other ethers including the alkyl ethers such as ethyl ether and the polyalkyleneglycol ethers such as bis(2-methoxyethyl) ether, may be used. Polar organic liquids, if inert to the reactants, are generally useful for this purpose. Hence a preferred method of preparing said oxides is to contact the metal with the imidazole in an inert, polar organic liquid to obtain a reaction mixture containing the imidazol-1-yl metal compound and subsequently contact said reaction mixture with the phosphonic dihalide to obtain said phosphine oxide compound.

Instead of imidazol-1-ylsodium or imidazol-1-yl-potassium, the use of imidazol-1-yllithium or of diimidazol-1-yl-magnesium or diimidazol-1-ylcalcium gives similarly good results. Of course, when using the imidazol-1-yl compounds of the divalent, alkaline earth metals, the substantially stoichiometric 1:1 ratio of metal compound to dihalide is advantageously used rather than the proportions shown above with the monovalent metal compounds. Also, instead of using phenylphosphonic dichloride, the dibromide or diiodide may be used, and the phenyl radical may be substituted by one or more lower alkyl radicals or replaced by naphthyl; e.g., the use of o-, m- or p-tolylphosphonic dichloride or dibromide, or of α- or β-naphthylphosphonic dichloride or diiodide or of the corresponding acenaphthenyl or fluorenyl compounds gives similarly good results.

The above examples are given by way of illustration only, and the present invention is not to be considered as limited by them. It will be obvious to those skilled in the art that many modifications can be made within the spirit of the invention, which is limited only by the terms of the appended claims.

What I claim is:

1. The method which comprises contacting a metal compound of the formula

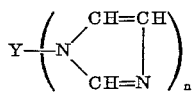

wherein Y is selected from the class consisting of alkali and alkaline earth metals and $n$ is an integer of from 1 to 2, with a dihalide of the formula

wherein R is aromatic hydrocarbon which is free of olefinic and acetylenic unsaturation and has from 6 to 12 carbon atoms and X is halogen having an atomic weight of at least 35, and recovering from the resulting reaction product a compound of the formula

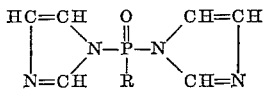

wherein R is as above defined.

2. The method defined in claim 1, further limited in that R is phenyl and Y is alkali metal.

3. The method which comprises contacting imidazol-1-ylsodium with phenylphosphonic dichloride and recovering diimidazol-1-ylphenylphosphine oxide from the resulting reaction product.

4. The method which comprises contacting imidazol-1-ylpotassium with phenylphosphonic dichloride and recovering diimidazol-1-ylphenylphosphine oxide from the resulting reaction product.

5. The method which comprises contacting imidazole with a metal selected from the class consisting of alkali and alkaline earth metal in an inert, organic polar liquid as solvent to obtain a reaction mixture containing a compound of the formula

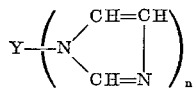

where Y is selected from the class consisting of alkali and alkaline earth metal and $n$ is an integer of from 1 to 2, and contacting said reaction mixture with a phosphonic dihalide of the formula

wherein R is aromatic hydrocarbyl which is free of olefinic and acetylenic unsaturation and contains from 6 to 12 carbon atoms and X is halogen having an atomic weight of at least 35, and recovering from the resulting reaction product a compound of the formula

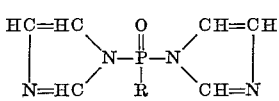

wherein R is as above defined.

6. The method defined in claim 5, further limited in that R is phenyl and the metal is alkali metal.

7. The method defined in claim 5, further limited in that R is phenyl and the metal is sodium.

References Cited by the Examiner

UNITED STATES PATENTS

| 3,075,011 | 1/1963 | Garner et al. | 260—551 |
| 3,111,526 | 11/1963 | Koopmans et al. | 260—309 |

FOREIGN PATENTS

| 504,864 | 8/1954 | Canada. |
| 729,586 | 5/1955 | Great Britain. |
| 848,952 | 9/1960 | Great Britain. |
| 894,820 | 4/1962 | Great Britain. |

OTHER REFERENCES

Kosolapoff et al.: Jour. Org. Chem., vol. 21, 413–14 (1956).

WALTER A. MODANCE, *Primary Examiner.*

NICHOLAS S. RIZZO, *Examiner.*

UNITED STATES PATENT OFFICE
CERTIFICATE OF CORRECTION

Patent No. 3,227,728                                      January 4, 1966

Leo P. Parts

It is hereby certified that error appears in the above numbered patent requiring correction and that the said Letters Patent should read as corrected below.

Column 1, line 25, the right-hand portion of the formula should read as shown below instead of as in the patent:

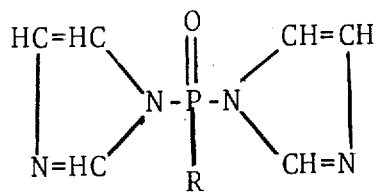

column 3, line 49, for "sobsequently" read -- subsequently --.

Signed and sealed this 5th day of September 1967.

(SEAL)
Attest:

ERNEST W. SWIDER                                EDWARD J. BRENNER
Attesting Officer                               Commissioner of Patents